UNITED STATES PATENT OFFICE.

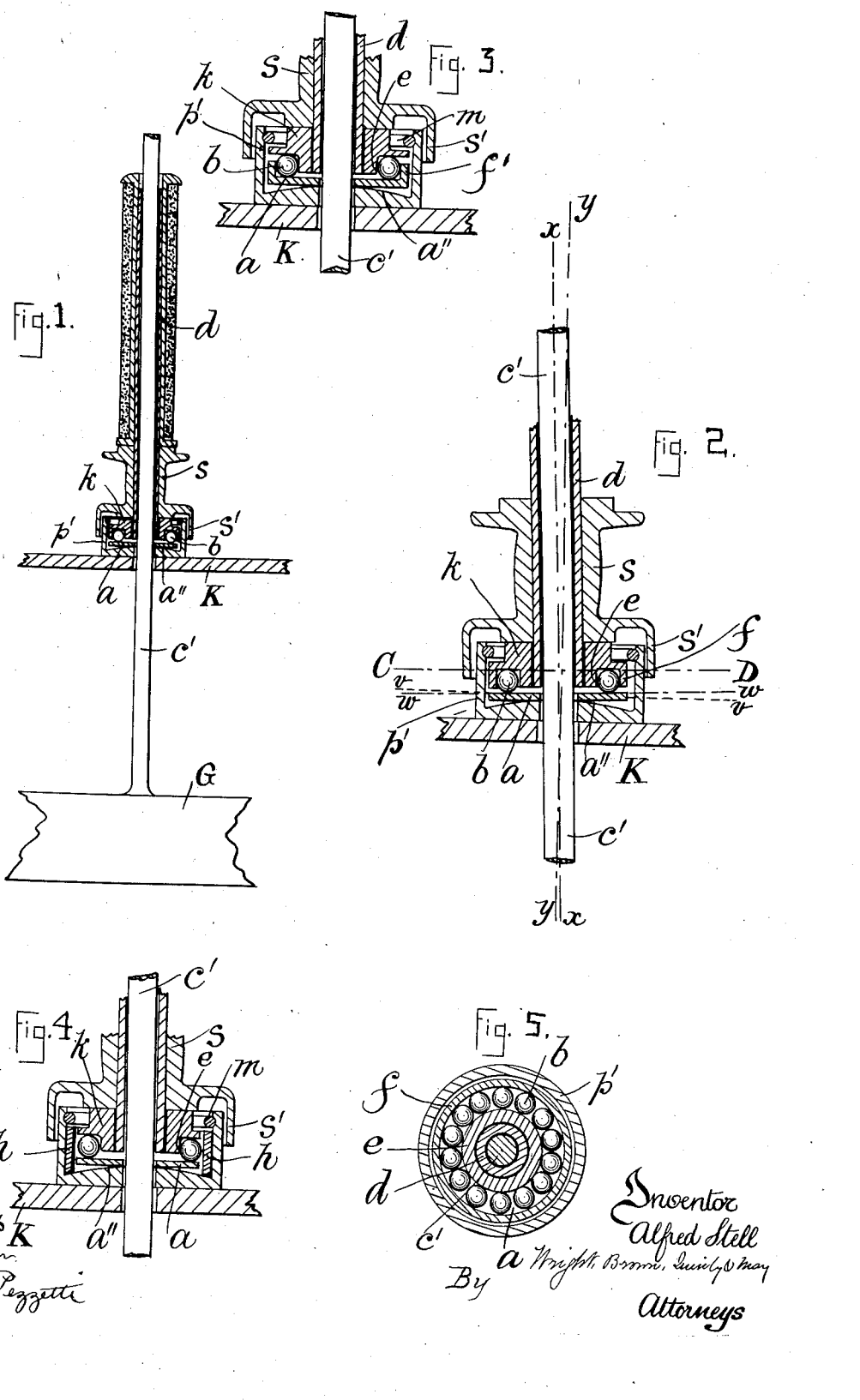

ALFRED STELL, OF STEETON, NEAR KEIGHLEY, ENGLAND.

BEARING FOR SPINNING-MACHINE SPINDLES.

No. 846,361.      Specification of Letters Patent.      Patented March 5, 1907.

Application filed August 29, 1905. Serial No. 276,194.

*To all whom it may concern:*

Be it known that I, ALFRED STELL, a subject of the King of Great Britain, and a resident of Green Hill, Steeton, near Keighley, in the county of York, England, have invented certain new and useful Improvements in Bearings for Spinning-Machine Spindles, of which the following description, together with the accompanying sheets of drawings, is a specification.

In the mounting of spindles or parts in connection therewith in the several classes of spinning-machines used in the production of yarns or threads of fibrous substances many devices have been employed for reducing the friction thereof, among which may be found many which consist of antifriction ball-bearings, and it is to this class of friction-reducing devices that my present invention relates. So far as I am aware, all devices of this character heretofore constructed have been so arranged as to provide no means for meeting any irregularities that might exist between the supports upon which the antifriction ball-bearings are mounted and the axes of the several spindles. In other words, while it is almost a mechanical impossibility to mount the whole series of spinning-machine spindles to operate with their axes exactly in the vertical plane it is also almost a mechanical impossibility to make the supports, and consequently the ball-races, to be in the horizontal plane, with the result that since the spindles will not thus rotate in a plane parallel with that of the ball-races the benefit or utility of such antifriction ball-bearings is considerably reduced.

To obviate these disadvantages is the object of the present invention, and this is accomplished by arranging the parts in such manner that the ball-races may be moved by the actions or weight of the spindles or parts which they support, so that said ball-races occupy at all times positions at right angles to the axis of said spindles or parts or a position parallel with their plane of rotation.

In the accompanying drawings, which are illustrative of my invention, Figure 1 is an elevation of a "dead-spindle" with its hollow or rotary spindle mounted upon ball-bearings constructed in accordance with my invention. Fig. 2 is a view similar to Fig. 1, but on an enlarged scale and showing only so much of the structure as is necessary to indicate the present invention, said structure including the dead and rotary or hollow spindles and the supporting structure, the spindles being shown as moved out of the vertical plane. Figs. 3 and 4 are views similar to Fig. 2, but showing modifications in the form of certain of the parts. Fig. 5 is a sectional view taken on the line C D of Fig. 2. Figs. 2, 3, 4, and 5 are drawn to the same scale.

Similar reference characters indicate similar parts in all of the views.

The rail which supports the dead-spindle is indicated at G, while that known as the "lifter-rail" is shown at K.

Referring particularly to Figs. 1 and 2, $p'$ designates the containing member or receptacle, having the inner surface $a''$ of its base part formed convex, as shown. $a$ designates the ball-race member, which rests on the surface $a''$, the upper surface of said member $a$ being substantially flat and forming the ball-supporting portion of the raceway for the series of balls $b$.

$d$ indicates the hollow or rotary spindle, mounted on the dead-spindle $c'$ and adapted to be driven by the pulley $s$. Mounted on the spindle $d$ is a sleeve $k$, in the lower surface of which is located the upper portion of the ball-raceway, the lateral ball-retaining walls being designated as $e$ and $f$.

As shown, the member $a$ and sleeve $k$ are loosely mounted within the receptacle $p'$ for a purpose hereinafter set forth and are retained therein by means of a spring-clip device $m$, mounted within a suitable annular recess formed in said receptacle. The lower edge $s'$ of the pulley $s$, which overhangs the whole bearing for affording protection against the entrance of most foreign matter or dirt, is of such size diametrically as to fit loosely over the outer face of the receptacle $p'$. By this arrangement the spindle $d$ and the parts carried thereby, together with the member $a$, are maintained in position at right angles to the axis of the spindle $c'$ by the weight of the superimposed parts and the inability of the spindle $c$ to rock on the spindle $c'$. It will therefore be understood that while the spindle $c'$ is vertical the ball-bearing structure will be substantially centrally located within the receptacle $p'$. As such true vertical is not retained by the spindle $c'$ during the spinning operation, the inclinations from such true vertical are overcome by the loose mounting of the ball-retaining parts within the receptacle $p'$ in connection with the convex surface $a''$, which permits the member $a$ to rock on its seat in a manner to retain the parallelism between it and the sleeve $k$, so that whatever vertical position the spindle $c'$ may assume during the operation the ball-retaining structure will retain its position relative to the spindle $c'$—viz., with the upper face of the member $a$ in position at right angles to the axis of the spindle $c'$. These variations are shown by comparing Figs. 1 and 2 of the drawings, Fig. 1 showing the spindle $c'$ vertical, its axis being represented in Fig. 2 by the line $y\,y$, while Fig. 2 shows the parts in the position assumed by them when the spindle $c'$ is out of such vertical position. (Indicated by the dotted line $x\,x$.) The variation in position of the upper surface of the member $a$ is similarly shown by the dotted lines $v\,v$ and $w\,w$ in Fig. 2.

Fig. 3 differs from Fig. 2 in showing the outer lateral wall for the balls $b$ as formed on the member $a$ instead of on sleeve $k$, such wall in Fig. 3 being indicated at $f''$, the structure being such that the wall extends from below instead of from above, as shown in Fig. 5.

In the structure shown in Fig. 4 the wall $f$ or $f'$ is omitted, the member $a$ and sleeve $k$ being formed as shown in Figs. 1 and 3, respectively, and the outer lateral wall for the balls is provided by the separate member $h$ in the form of a ring.

These modifications in structure do not, however, affect the operation as described in Fig. 2, they indicating merely different ways in which the balls may be retained in position without modifying the relationship of member $a$ and its convex supporting-surface.

The engagement between the parts $d$, $k$, and $s$ may be effected in any preferred manner, as by securing the pulley $s$ and sleeve $k$ on the spindle $d$ by a drive fit.

In the different structures shown the parts which support the balls and retain them in position may readily be made of hardened steel or other metal and are so mounted that they may rotate freely and therefore offer little resistance to the rotation of the balls.

Such being the nature and object of my said invention, what I claim is—

1. An improved spindle-bearing comprising an outer receptacle or containing member, a ball-race member loosely mounted therein and having a substantially flat upper surface, one of said members having a convex face to permit the ball-race member to rock, and antifriction-balls mounted upon the upper surface of said ball-race member, substantially as specified.

2. An improved spindle-bearing comprising an outer receptacle or containing member, a ball-race member loosely mounted therein and having a substantially flat upper surface, one of said members having a convex face to permit the ball-face member to rock, antifriction-balls mounted on the upper surface of said ball-race member, and a circular wall or ring for retaining the balls in a lateral direction, substantially as herein specified.

3. In a bearing for a hollow spindle, an outer receptacle having the upper surface of its base part of a convex form, a ball-race mounted on said convex surface, antifriction-balls mounted on said ball-race, and a circular retainer for said antifriction-balls, substantially as herein specified.

4. In a bearing for a hollow spindle, an outer receptacle having the upper surface of its base part of a convex form, a ball-race mounted on said convex surface, antifriction-balls mounted on said ball-race, and a circular retainer for said antifriction-balls, said retainer having a flange near its axis to form a lateral stay for the balls, substantially as herein specified.

5. In a bearing for a hollow spindle, an outer receptacle having the upper surface of its base part of a convex form, a ball-race mounted on said convex surface, said ball-race having a flange encircling its outer edge to retain the balls laterally, antifriction-balls mounted on said ball-race, and a circular retainer for said antifriction-balls, substantially as herein specified.

6. In a bearing for a hollow spindle, an outer receptacle having the upper surface of its base part of a convex form, a ball-race mounted on said convex surface, antifriction-balls mounted on said ball-race, a circular retainer for said antifriction-balls, a hollow spindle, a relatively stationary spindle, and a spring-clip taking into a groove formed on the inner surface of the outer receptacle, substantially as herein specified.

In testimony whereof I have affixed my signature in the presence of two witnesses

ALFRED STELL.

Witnesses:
FRED HAMMOND,
MILFORD HEY.